Feb. 14, 1967   P. L. LAWRENCE   3,304,535
CORRELATION OF GEOPHYSICAL LOGS
Filed April 30, 1964   3 Sheets-Sheet 1
*Fig. 1*
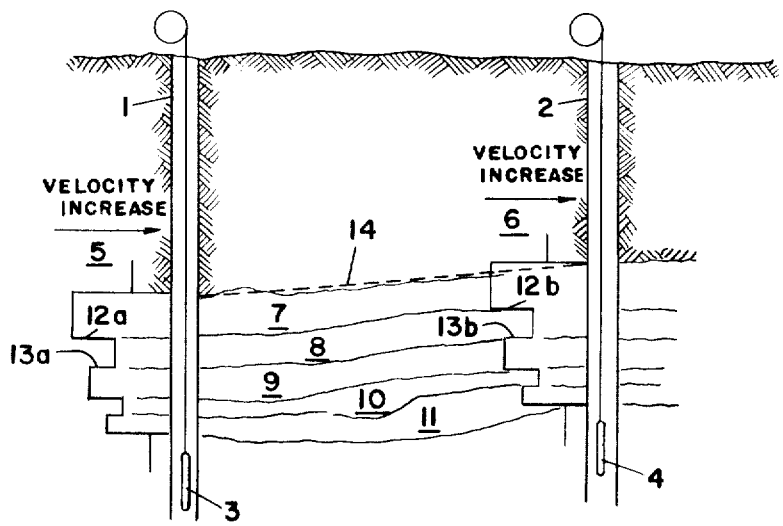
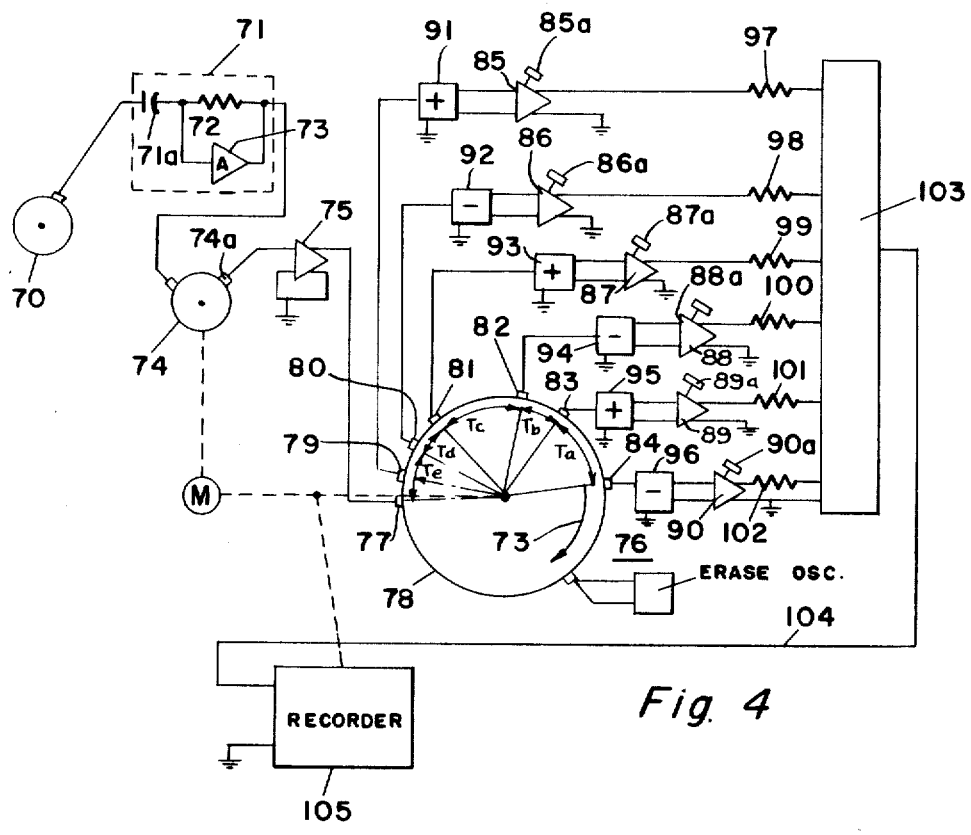
*Fig. 4*

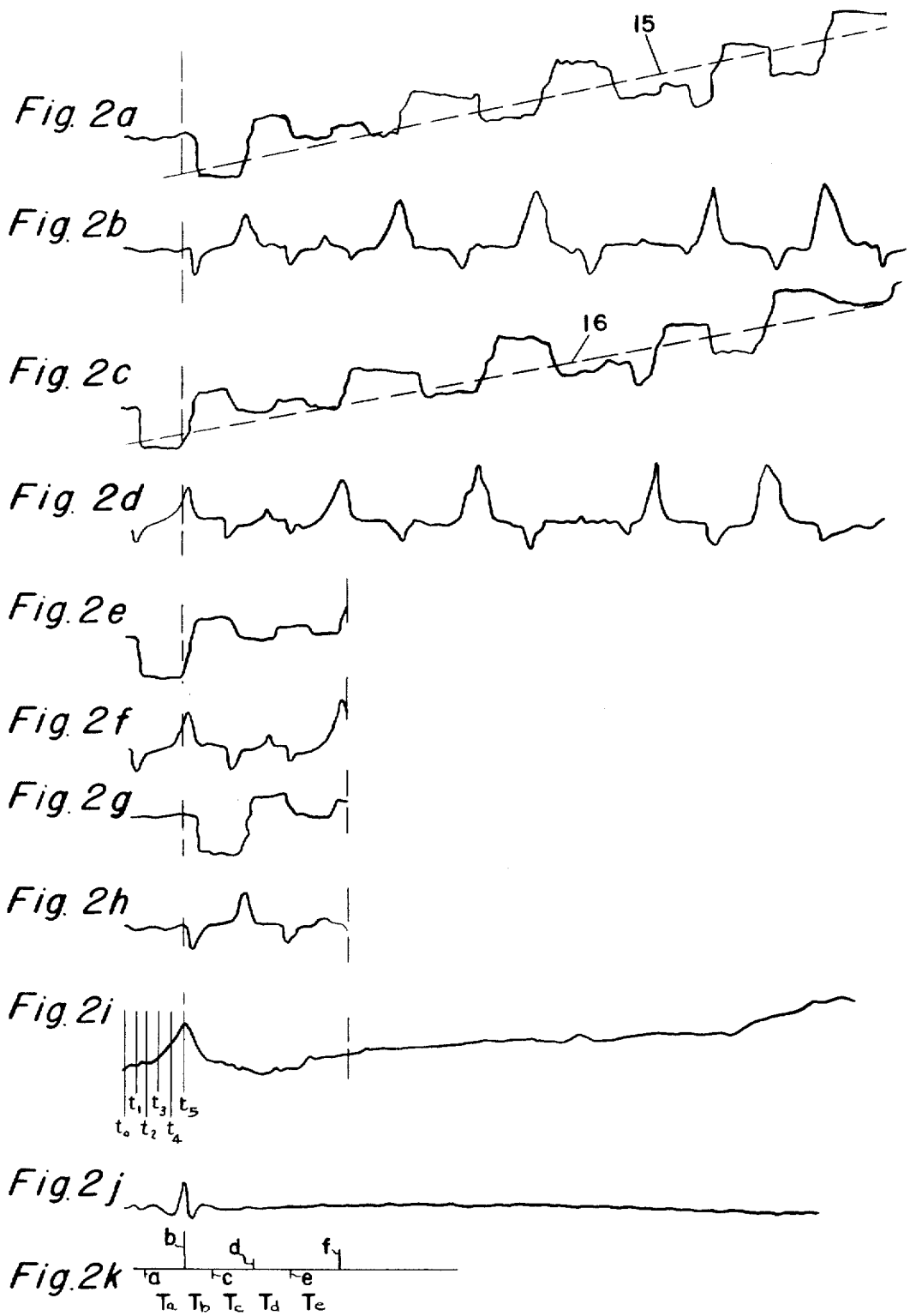

United States Patent Office 3,304,535
Patented Feb. 14, 1967

3,304,535
CORRELATION OF GEOPHYSICAL LOGS
Philip L. Lawrence, Riverside, Conn., assignor to Mobil Oil Corporation, a corporation of New York
Filed Apr. 30, 1964, Ser. No. 364,031
4 Claims. (Cl. 340—15.5)

This invention relates to an improved technique for correlating geophysical logs and, more particularly, to a technique which sharpens the cross-correlation function obtained by cross-correlating two geophysical logs and provides improved results when correlation is performed on a log which does not have a zero mean.

In geophysical exploration, it is conventional to obtain a log of a borehole, which log is indicative of the subsurface layering of the earth in an area adjacent the borehole. There are numerous techniques for obtaining such a log. For example, an acoustic logging tool including a transmitter of acoustic pulses and receivers for receiving the acoustic pulses after they have travelled through the earth may be lowered into the borehole to obtain a log of the acoustic velocity of the earth as a function of depth of borehole. Similarly, an electric log indicative of the resistivity of the earth as a function of depth may be obtained or a gamma ray log indicative of the neutron absorption characteristics of the earth as a function of depth may be obtained. All of these logs are quite useful in indicating the subsurface layering of the earth and are, therefore, useful in locating oil bearing formations.

Geophysical logs usually contain, in addition to sharp variations in the log, a slowly varying mean component. This slowly varying mean component may be present for a number of reasons, a common reason in sonic or gamma ray logs being that the velocity or density of the earth generally increases with increasing depth. Again, thick layers in the earth interject a slowly varying component. When a correlation operation is performed on logs of this type, this slowly varying mean component introduces spurious and, therefore, undesirable peaks in the correlation function.

Frequently attempts have been made to compensate for the presence of the varying mean function by computing the mean for selected short sections of the log and subtracting the computed mean to ostensibly provide a log with a zero mean. This technique is not completely satisfactory. In actual practice, a zero line is drawn through the log along its length so that both positive and negative departures are produced. The component represented by this zero line is then substracted from the log. However, this does not actually remove the slowly varying component, but tends to compensate for it only in the event that the slowly varying mean component is not in any way oscillatory and is substantially the same in the two logs which are to be cross-correlated.

Often, it is desirable to perform a correlation operation on logs. As an example of a correlation operation, consider the cross-correlation of two logs. A portion of one log is successively shifted small increments of time with respect to the other log. At each increment of time, all of the points on the portion of one log are multiplied by the corresponding points on the other log. The resultant products are all summed to form a cross-correlation function. This cross-correlation function varies with time as the portion of the log is shifted along the other log. The cross-correlation function has a maximum at the increment of time at which the portion of the log most nearly matches the portion of the other log against which it is being cross-correlated.

Performance of a correlation operation on geophysical logs is desirable in many instances. One example is the determination of dip of subsurface beds between adjacent boreholes. In this case, the cross-correlation of the two logs produces a function having a maximum which occurs at a depth difference which is indicative of the dip of the subsurface layers between the two boreholes.

Another example of the desirability of performing a correlation operation on two logs is the determination of the degree of match, or similarity, of portions of the logs. The correlation function produced by cross-correlating the two logs has a maximum value having a magnitude indicative of the degree of match, or similarity, of sections of the two logs. Still another example of the use of correlation techniques in geophysical prospecting is the correlation of a three component dip meter log from a single borehole.

In accordance with one aspect of this invention, the above difficulties in correlating geophysical logs introduced by slowly varying components are obviated by differentiating both logs prior to the correlation operation. This differentiation removes the slowly varying mean component.

In accordance with another aspect of this invention, there are generated a first electrical signal representative of a first log obtained from a first borehole and a second electrical signal representative of at least an operator portion of a second log obtained from a second borehole. Then, the first and second electrical signals are applied to a high-pass filter to cancel the slowly changing mean components of the first and second logs. From the output of the high-pass filter there are produced third and fourth electrical signals whose variation in amplitude with respect to an average value is greater respectively than the variation in amplitude with respect to an average value of the first and second electrical signals. Finally, the third and fourth electrical signals are applied to a correlator to produce by cross-correlation a correlogram. The correlogram has a maximum identifying the time separation between the operator portion on the second signal and its counterpart in the first signal to indicate the dip of subsurface layering between the first and second boreholes.

The differentiation of the logs before correlation also improves the results obtained from the correlation operation in other ways. The differentiation of both logs before correlation improves the sharpness of the maximum in the resultant correlation function. Many geophysical logs before differentiation are relatively narrow band functions. As it is well known by those familiar with correlation techniques, and as will be subsequently explained, correlation of narrow band signals produces a cross-correlation function having a plurality of peaks and it is often difficult to ascertain the true maximum in such a cross-correlation function. This is often referred to as a "leggy" cross-correlation function. Differentiation of the signal produces a broader band function which produces a sharper correlation maximum. The sharp cross-correlation function maximum produced by cross correlating two broad band functions, sometimes referred to as functions with increased variance, is quite easily identified.

The foregoing and further objects, features and advantages of the present invention will be better understood from the following more detailed description taken in conjunction with the drawings, in which:

FIG. 1 shows two adjacent boreholes and the subsurface layering of the earth in the vicinity of these boreholes;

FIGS. 2a–2k are waveforms showing the improved correlation function which is obtained when logs containing a slowly varying mean component are differentiated prior to the correlation;

FIG. 4 shows an analog system for carrying out the invention.

Figure 3A:
FIGS. 3a–3j are waveforms showing the improved sharpness of the correlation function obtained when narrow band signals are differentiated before the correlation.
Figure 3B:
Figure 3C:

Referring to FIG. 1, there are shown two adjacent boreholes 1 and 2 from which logs representing the subsurface layering of the earth may be obtained. One type of log commonly used is a velocity log obtained from the acoustic logging tools 3 and 4 which are lowered into the boreholes. Such logging tools provide a log of the acoustic velocity of the earth as a function of depth. Representative logs are shown at 5 and 6 as representing acoustic velocity as a function of depth. The acoustic velocity changes in accordance with the layering of the earth. As shown in FIG. 1, there has been diagrammatically represented the successive layers 7, 8, 9, 10 and 11. The velocity logs indicate these successive layers by the changes or variations in the log such as those shown at 12a, 12b, 13a and 13b.

In addition to determining the preence of the layers 7, 8, 9, 10 and 11, it is also desirable to ascertain the dip of the layering between the boreholes. This dip is represented by the dashed line 14 which slopes from the layering adjacent borehole 2 downwardly to the layering adjacent borehole 1.

Referring now to FIGS. 2a through 2k, there is shown in FIG. 2a a typical log which may be obtained, for example, from the borehole 1. There is shown in FIG. 2c another typical log which may be obtained, for example, from the borehole 2. It will be noted that the logs are quite similar in representing the layering of the earth. The important difference between the two logs is that the log of FIG. 2a lags the log of FIG. 2c by a small time increment. This, of course, is caused by the fact that the subsurface layers adjacent borehole 1 are slightly deeper than the corresponding layers adjacent borehole 2 and, hence, the variations in the log representing these layers occur at a later time on the log of FIG. 2a. This difference in depth, referred to as the dip of the subsurface layers between the two boreholes, can readily be determined from the logs, 2a and 2c, by a cross-correlation operation, as will be subsequently explained.

Another important feature of the logs shown in 2a and 2c is that they both have a slowly increasing mean component shown by the dashed line 15 in FIG. 2a and by the dashed line 16 in FIG. 2c. These mean components will produce errors in the function obtained by cross-correlating a portion of the log of FIG. 2a with the log of FIG. 2c. This can best be explained as follows.

Usually, in performing a cross-correlation operation, a portion of one log is cross-correlated against the other log. For example, the portion of the log of FIG. 2c, which portion is shown in FIG. 2e, may be cross-correlated with the log of FIG. 2a. This is accomplished by multiplying all points on the portion of FIG. 2e with the corresponding points of FIG. 2a and then summing all of the products. The log of FIG. 2e is then shifted to the right an incremental amount and the same multiplication and addition are performed. The portion of FIG. 2e is shifted successively to the right by incremental amounts and a value of the cross-correlation function is obtained for each incremental shift. The result is a cross-correlation function, such as that shown in FIG. 2i. The cross-correlation function should have a maximum at the incremental time shift at which the portion 2e most nearly matches the log 2a against which it is being cross-correlated. As shown in FIG. 2i, this occurs at the time $t_5$. That is, when the portion of FIG. 2e has been shifted by 5 increments of time, as shown in FIG. 2g, the best match between the logs is obtained and there is a maximum in the cross-correlation function. Since the correlation maximum occurs at $t_5$, this indicates that there is a time shift between the logs of FIGS. 2a and 2c of 5 time increments. Thus, there has been provided an easy manner of determining the shift between two logs or the dip of the subsurface layering between the two boreholes from which the logs were obtained. This method of determining dip becomes quite important when it is desired to automate the computations, since the use of correlation techniques permits the dip to be automatically computed without resort to the visual observation method of computing dip from two adjacent logs, as has previously been practiced.

One difficulty in obtaining the maximum in the correlation function arises because of the slowly varying mean components 15 and 16 of FIGS. 2a and 2c, respectively. As the portion of the log shown in FIG. 2e, sometimes referred to as an operator portion, is shifted successively to the right, the values obtained for the cross-correlation function will constantly increase because the mean component 15 of FIG. 2a is constantly increasing. This may result in a value of the cross-correlation function at the extreme right of FIG. 2i which exceeds the true maximum in the cross-correlation function occurring at $t_5$. This is a false maximum in the cross-correlation function and produces results which are in error. This problem is minimized in accordance with the present invention by differentiating the logs of FIGS. 2a and 2c to depress the slowly varying mean components. When the log of FIG. 2a is differentiated, there is produced the function shown in FIG. 2b and when the log of FIG. 2c is differentiated, there is produced the function shown in FIG. 2d. It can be seen that the mean component is not present in the functions of FIGS. 2b and 2d. By cross-correlating an operator portion of FIG. 2d, as shown in 2f, with the function of FIG. 2b, there will be produced a cross-correlation function, shown in FIG. 2j, which has only one well defined maximum.

In addition to eliminating the above discussed problem caused by slowly varying mean components in the log, the step of differentiating the logs before cross-correlation improves the sharpness of the maximum in the resultant cross-correlation function in another way. Differentiation of a narrow band signal, such as the logs of FIGS. 2a and 2c, produces a broader band signal or a signal having an increased variance which produces a sharper correlation. This will be described in more detail with reference to the waveforms of FIGS. 3a–3j.

Figure 3D:

FIG. 3a shows a narrow band signal which is to be auto-correlated. If this signal is differentiated, the waveform shown in FIG. 3b will be produced. The correlation of the differentiated signal of FIG. 3b will produce a correlation function having a sharp peak as at 50 in FIG. 3c. On the other hand, if the waveform of FIG. 3a is correlated without differentiation, there is produced a "leggy" correlation function, as is shown in FIG. 3d. This correlation function does not have a sharp peak marking the maximum correlation.

In the frequency domain it will be appreciated that differentiation increases the high frequency content of a signal. This increases the variance of the signal. A signal with considerable variance will produce a much sharper correlation function than a signal with little variance. Therefore, it can be seen that differentiation of any function which is to be correlated produces a sharper resultant correlation function. This may be further illustrated with reference to FIG. 3e, which is a representation of a velocity log wherein a large velocity contrast is indicated at 51 and another contrast is indicated at 52. These two velocity contrasts delineate a rather wide high velocity layer in the earth. The velocity contrast at 53 is indicative of another velocity change due to layering in the earth.

Figure 3E:
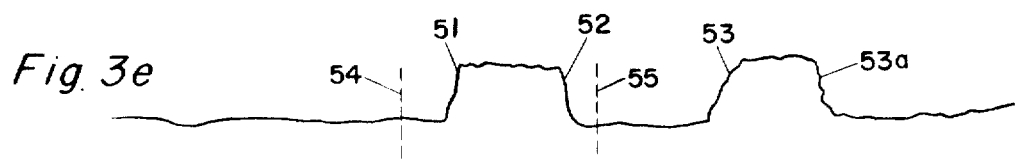
Figure 3F:
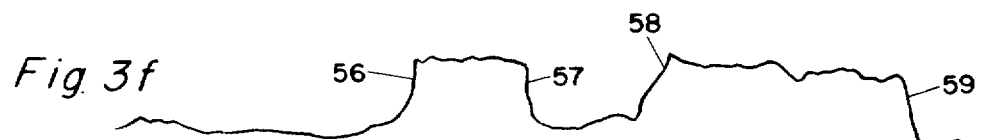

Consider the situation in which an operator between the points 54 and 55 is cross-correlated against a log from another borehole, such as that shown in FIG. 3f. The log of FIG. 3f contains velocity contrasts 56 and 57 which delineate the same velocity layering in the earth as is indicated by the contrasts 51 and 52 in FIG. 3e. The log in FIG. 3f also indicates a velocity contrast at 58 and a velocity contrast at 59. These two velocity contrasts delineate a thicker layer in the earth than did the contrasts 53 and 53a in FIG. 3e.

Figure 3G:
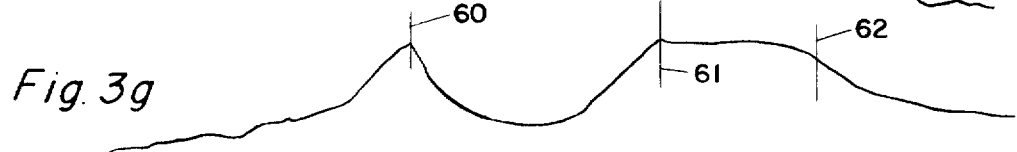

When the operator between the portions 54 and 55 of FIG. 3e is cross-correlated against the velocity log of FIG. 3f, a cross-correlation function, such as that shown in FIG. 3g, is produced. This cross-correlation function has one peak at 60 which occurs at the time when the contrast 51 of FIG. 3e is coincident with the contrast 56 of FIG. 3f, and the contrast 52 is coincident with the contrast 57. After this time, the cross-correlation function decreases as the operator is shifted to the right. However, another peak is produced when the operator coincides with the velocity layering between the contrasts 58 and 59. When the contrast 51 is coincident with the velocity contrast 58 and the contrast 52 is somewhere in between the contrasts 58 and 59, a large cross-correlation function is produced as at 61. This large value of cross-correlation continues for a period of time, extending to the point 62, at which time the velocity contrast 52 coincides with the velocity contrast 59. As the operator is shifted further to the right, the cross-correlation function decreases.

However, it will be seen that a large value of cross-correlation is indicated between 61 and 62. It is quite difficult to determine from this cross-correlation function whether the peak at 60 indicates the best match between the two logs, or whether the peak between 61 and 62 indicates the best match.

This problem is obviated when both logs are differentiated before the cross-correlation.

Figure 3H:
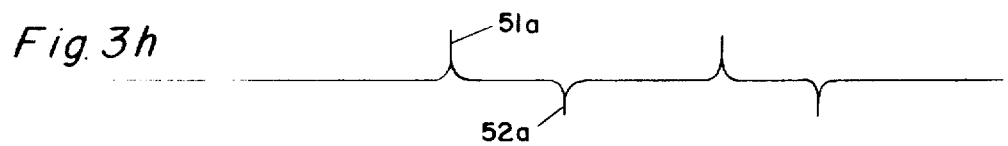
Figure 3I:
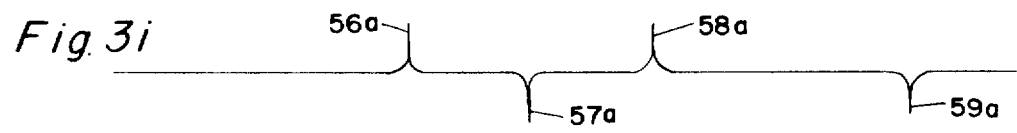
Figure 3J:
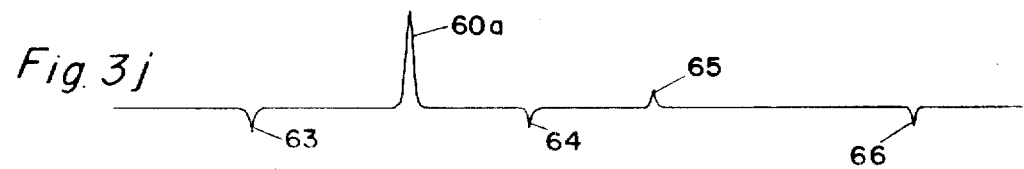

The velocity log of FIG. 3e, when differentiated, produces the waveform of FIG. 3h in which the spike at 51a corresponds with the velocity contrast at 51, the spike at 52a indicates the velocity contrast at 52, and so on. Similarly, the velocity log shown in FIG. 3f, when differentiated, produces the waveform as shown in FIG. 3i. In this waveform, the spike at 56a corresponds with the velocity contrast at 56; the spike at 57a corresponds with the velocity contrast at 57, and so on. When the waveform consisting of the portion 51a to 52a in FIG. 3h is cross-correlated against the waveform of FIG. 3i, only one maximum in the cross-correlation is produced. This is shown in FIG. 3j, wherein the spike 60a indicates the maximum cross-correlation which occurs when the spike 51a coincides exactly with the spike 56a; the spike 52a coincides exactly with the spike 57a. When the waveform of FIG. 3h has been shifted by any other amount with respect to the log of FIG. 3h, only smaller values of cross-correlation are produced as indicated at 63, 64, 65 and 66.

There will now be described one form of equipment which may be used in carrying out the invention. In the embodiment to be described, analog equipment including a time domain filter is used for performing the correlation operation. There is shown in FIG. 4 the recorder 70 which may be of the magnetic drum type and upon which has been recorded one of the log functions to be cross-correlated. For example, the log shown in FIG. 2a may be recorded upon the recorder 70. This log is differentiated by differentiator 71 including the usual capacitor 71a, resistor 72 and high gain amplifier 73. The output of differentiator 71 is rerecorded on a magnetic drum 74. The function recorded on drum 74 is similar to that shown in FIG. 2b. This function is picked up by pickup head 74a and applied through amplifier 75 to the time domain filter 76. More particularly, the function is applied through recording head 77 to a magnetic drum 78.

The time domain filter 76 is provided with a plurality of pickup heads, six of which, the heads 79–84, have been illustrated as angularly separated from one another by distances which, in terms of spacing on the log, correspond with the time intervals $T_a-T_e$, shown in FIG. 2k. FIG. 2k represents samples of the operator portion of the differentiated log which is to be cross-correlated with the differentiated log recorded on drum 74. The samples $a$–$f$ represent the amplitude of the operator portion of FIG. 2f at selected times corresponding with velocity changes in the logs. Similarly, the time intervals $T_a-T_e$ represent the time intervals between these samples. As described, the samples are not equally spaced. It will be appreciated that the samples may be equally spaced or may occur at other selected times. The only limitation on the samples is that they adequately define the waveform on the log being sampled.

The gains of amplifiers 85–90 are adjusted by suitable gain control means represented by adjusting knobs 85a–90a to levels proportional to the amplitudes respectively $f$–$a$ of the samples shown in FIG. 2k. Similarly, the time spacings between the pickup heads 79–84 are adjusted to correspond with the times $T_e-T_a$ respectively. That is, the spacing between pickup heads 83 and 84 corresponds with $T_a$, the spacing between pickup heads 82 and 83 corresponds with $T_b$ and the spacing between pickup heads 81 and 82 corresponds with $T_c$, and so on.

Also, polarity determining switches 91–96 are provided to determine the correct polarity of the sample. That is, since the sample "$a$" is negative in polarity, the polarity determining means 96 is switched to a negative polarity with respect to, for example, the polarity determining means 95 which, as required by sample "$b$," introduces a positive polarity. The other switches 91–94 similarly have their polarity set in accordance with the polarities indicated by the samples on FIG. 2k.

The outputs from the amplifiers 85–90 are respectively applied by way of adding or summing resistors 97–102 to an adding circuit 103 which may be an amplifier. The summation signal, representing the cross-correlation function, is then applied by way of conductor 104 to a suitable recorder 105 for production on a recording medium of a cross-correlation function which contains only a single easily identifiable maximum.

The operation of the system of FIG. 4 in performing a cross-correlation function will be briefly summarized. A differentiated log, such as that shown in FIG. 2d, is recorded on magnetic drum 74. The differentiated log is then recorded on drum 78 for successive playback by the pickup heads 79–84. These pickup heads are connected to gain adjusting circuits, each of which represents one of the samples $a$–$f$ of the operator portion, FIG. 2k, of the log which is to be cross-correlated. The result is that as the drum 78 rotates, successive portions of the differentiated log of FIG. 2b are multipled by the corresponding samples $a$–$f$ of the log with which it is being cross-correlated. The sums are added in adder 103, thereby producing a cross-correlation function which has a maximum occurring at a time indicative of the best fit between the two logs which are being cross-correlated.

While a particular embodiment of the invention has been shown and described, it will, of course, be understood that various changes may be made without departing from the principles of the invention. The appended claims are, therefore, intended to cover any such modifications within the true spirit and scope of the invention.

What is claimed is:

1. In geophysical exploration wherein a first log, obtained from a first borehole and indicative of the subsurface layering of the earth adjacent said first borehole, is cross-correlated with at least an operator portion of a second log, obtained from a second borehole and indicative of the subsurface layering of the earth adjacent said second borehole, to produce a cross-correlation having a maximum occurring at a time indicative of the dip of the subsurface layering between said first and said second boreholes, and wherein said first and said second logs include variations indicative of changes in said subsurface layering and a mean component of magnitude which changes slowly with respect to said variations, the improvement comprising generating a first electrical signal varying as a function of the subsurface layering as represented by the first log, generating a second electrical signal varying as a function of the subsurface layering as represented by at least the operator portion of the second log, applying said first and second electrical signals to a high-pass filter to cancel the slowly changing mean components and thereby produce third and fourth electrical signals whose variation in amplitude with respect to an average value is greater respectively than the variation in amplitude with respect to an average value of said first and second electrical signals, and applying said third and fourth electrical signals to a correlator to produce by cross-correlation a correlogram having a maximum identifying the time separation between said operator portion and its counterpart in said first log to indicate the dip of subsurface layering between said first and second boreholes.

2. The method recited in claim 1 wherein the step of cross-correlating said third signal and said fourth signal includes multiplying a portion of said third signal with overlying portions of said fourth signal, adding all of the products obtained from the foregoing multiplication step to obtain a sum indicative of one value of said cross-correlation function, shifting said third signal by successive small increments with respect to said fourth signal, and repeating the aforesaid multiplication and addition steps at each successive increment to obtain successive values of said correlogram.

3. The method of claim 1 wherein said first and second signals are differentiated to produce said third and fourth signals.

4. The method of claim 1 wherein the cross-correlation is performed in the time domain.

References Cited by the Examiner

UNITED STATES PATENTS

| | | | |
|---|---|---|---|
| 2,907,400 | 10/1960 | Swafford | 340—15.5 X |
| 2,962,714 | 11/1960 | Meixel et al. | 343—100.7 |
| 2,972,733 | 2/1961 | Bucy | 340—15.5 |
| 3,241,102 | 3/1966 | Peterson | 340—15.5 X |

BENJAMIN A. BORCHELT, *Primary Examiner.*

SAMUEL FEINBERG, *Examiner.*

R. M. SKOLNIK, *Assistant Examiner.*

UNITED STATES PATENT OFFICE
CERTIFICATE OF CORRECTION

Patent No. 3,304,535                              February 14, 1967

Philip L. Lawrence

It is hereby certified that error appears in the above numbered patent requiring correction and that the said Letters Patent should read as corrected below.

Column 3, line 20, for "preence" read -- presence --; column 6, line 65, for "having" read -- function --.

Signed and sealed this 7th day of November 1967.

(SEAL)
Attest:

Edward M. Fletcher, Jr.
Attesting Officer

EDWARD J. BRENNER
Commissioner of Patents